US007953429B2

(12) United States Patent
Aoike et al.

(10) Patent No.: US 7,953,429 B2
(45) Date of Patent: May 31, 2011

(54) ELECTRONIC COMMUNICATION DEVICE AND METHOD OF OPERATING TELEPHONE DIRECTORY LIST IN THE SAME

(75) Inventors: Toru Aoike, Tokyo (JP); Hiroyuki Toba, Tokyo (JP)

(73) Assignee: NEC Corporation, Tokyo (JP)

( * ) Notice: Subject to any disclaimer, the term of this patent is extended or adjusted under 35 U.S.C. 154(b) by 704 days.

(21) Appl. No.: 12/064,716

(22) PCT Filed: Aug. 24, 2006

(86) PCT No.: PCT/JP2006/316637
§ 371 (c)(1),
(2), (4) Date: Feb. 25, 2008

(87) PCT Pub. No.: WO2007/026600
PCT Pub. Date: Mar. 8, 2007

(65) Prior Publication Data
US 2009/0137216 A1    May 28, 2009

(30) Foreign Application Priority Data

Aug. 30, 2005   (JP) ................................. 2005-248987

(51) Int. Cl.
*H04Q 7/20* (2006.01)
(52) U.S. Cl. ........ 455/518; 455/519; 455/500; 455/517; 455/414.1; 455/426.1; 370/259; 370/261; 370/262; 370/310; 370/312
(58) Field of Classification Search .................. 455/518, 455/519, 500, 517, 426.1, 426.2, 414.1–414.4, 455/445, 422.1, 403, 550.1, 556.1, 556.2, 455/566, 564; 370/259, 261, 262, 310, 312
See application file for complete search history.

(56) References Cited

U.S. PATENT DOCUMENTS

| 6,628,767 | B1 | 9/2003 | Wellner et al. | |
|---|---|---|---|---|
| 2003/0119540 | A1* | 6/2003 | Mathis | 455/518 |
| 2005/0143135 | A1 | 6/2005 | Brems et al. | |
| 2006/0003783 | A1* | 1/2006 | Fukui et al. | 455/517 |
| 2007/0021131 | A1* | 1/2007 | Laumen et al. | 455/518 |

FOREIGN PATENT DOCUMENTS

| CN | 1492705 A | 4/2004 |
|---|---|---|
| JP | 06334726 A | 12/1994 |
| JP | 08274888 A | 10/1996 |
| JP | 2001036630 A | 2/2001 |
| JP | 2002536928 A | 10/2002 |
| JP | 2004252609 A | 9/2004 |

OTHER PUBLICATIONS

European Office Action for EP 06 796 750.5 dated Mar. 30, 2010.
Chinese Office Action for CN 200680032076.6 dated May 28, 2010.

\* cited by examiner

*Primary Examiner* — Keith T Ferguson

(57) ABSTRACT

The present invention avoids taking much time for finding a person who speaks in a lot of numbers out of a telephone directory list of a mobile phone in a step of starting PTT communication. The device for receiving data receives voice signals from other mobile phones through a server. The device for controlling speaker's voice output outputs speaker's voice to a speaker, and further outputs his/her name to a display unit. The device for counting up a number of speeches counts up a number of speeches made by each of speakers stored in a telephone directory list. The device for terminating PTT communication terminates PTT communication. The device for re-arranging a telephone directory list re-arranges persons recorded in the telephone directory list, in accordance with a number of speeches.

48 Claims, 8 Drawing Sheets

FIG.5

| Persons Recorded in Telephone Directory | No. of Speeches |
|---|---|
| A | 5 |
| B | 3 |
| C | 1 |
| D | 1 |
| E | 1 |
| F | 1 |
| G | 1 |

FIG.6

| Persons Recorded in Telephone Directory | No. of Speeches |
|---|---|
| Aさん | 8 |
| Bさん | 3 |
| Cさん | 1 |
| Dさん | 2 |
| Eさん | 1 |
| Fさん | 1 |
| Gさん | 3 |

FIG.7

| Persons Recorded in Telephone Directory | No. of Speeches |
|---|---|
| A | 8 |
| B | 3 |
| G | 3 |
| D | 2 |
| C | 1 |
| E | 1 |
| F | 1 |

ELECTRONIC COMMUNICATION DEVICE AND METHOD OF OPERATING TELEPHONE DIRECTORY LIST IN THE SAME

This application is based upon and claims the benefit of priority from Japanese Patent Application No. 2005-248987 filed on Aug. 30, 2005, the entire disclosure of which, including specification, claims, drawings and summary, is incorporated herein by reference in its entirety.

BACKGROUND OF THE INVENTION

1. Field of the Invention

The invention relates to a method of operating a telephone directory list in an electronic communication device, an electronic communication device, a method of operating a telephone directory list in PTT communication, and a PTT communication system, and more particularly to a method of operating a telephone directory list in an electronic communication device, an electronic communication device, a method of operating a telephone directory list in PTT communication, a PTT communication system, and a computer-readable storage medium storing therein a program for carrying out the method, in all of which a telephone directory list is re-arranged in accordance with a number of speech in PTT communication.

2. Description of the Related Art

With a mobile phone and Internet being spread, a PTT (Push to Talk) communication suitable to mobile phones is going to be put into practice (for instance, see Japanese Patent Application Publications 6-334726, 2002-536928, and 2004-252609). Herein, PTT communication is a service in which VoIP technology and packet-exchange technology are used to enable multi-casting communication (broadcasting) to a plurality of persons by virtue of half-duplex conversation.

PTT communication is made as follows.

First, a transmitter who is going to start PTT communication has to carry out a step of starting PTT communication with PTT communication members who are in advance registered.

To this end, a transmitter who is going to start PTT communication displays a telephone directory list in a screen of his/her mobile terminal device, and selects members with whom the transmitter is going to make PTT communication, out of the telephone directory list.

The transmitter can arbitrarily select members with whom the transmitter is going to make PTT communication. For instance, the transmitter can select co-workers or friends of the same generation. In general, when the transmitter selects such members out of a telephone directory list, he/she frequently selects a person who speaks in a great number, that is, a person who frequently makes PTT communication.

Then, the transmitter actuates a dedicated key (or a key assigned to PTT communication) to thereby transmit a request of transmitting a PTT call, to a server.

On receipt of a request of transmitting a PTT call, the server establishes PTT communication by SIP (Session Initiation Protocol) between the mobile terminal device and the server.

Then, the server requests mobile terminal devices of members designated by a mobile terminal device of the transmitter, to join PTT communication.

The mobile terminal devices receiving a request to join PTT communication transmit a response to the server as to whether they join PTT communication.

The server establishes PTT communication by SIP with the mobile terminal devices which transmit a response that they join PTT communication.

Thus, the mobile terminal device which requested the server to transmit a PTT call can make conversation in PTT communication with each of the mobile terminal devices which transmitted a positive response to the server.

A user who would like to speak can request a right of speaking to a server by actuating a dedicated key (or a key assigned to PTT communication) of his/her mobile terminal device. If another user has already acquired a right of speaking, he/she cannot have a right of speaking.

If a user is allowed to speak by a server, he/she can speak while actuating the above-mentioned key. His/her words are transmitted in multi-casting communication to mobile terminal devices of members who join in PTT communication, from a server, and are output to the members.

Not only voice data, but also a telephone number of a user who is now speaking are transmitted in multi-casting communication to other members. Specifically, both a telephone number of a user who is now speaking and voice data are transmitted to mobile terminal devices of other members, and a telephone number of a user who is now speaking is displayed in a screen of mobile terminal devices of other members. Accordingly, each of the other members can not only listen to voices, but also know a telephone number of a member who is now speaking in a screen of his/her mobile terminal device.

The above-mentioned conventional step to be carried out for staring PTT communication is accompanied with a problem that it takes much time to find a person (or persons) who speaks (or speak) in a great number out of a telephone directory list equipped in his/her mobile terminal device by turning pages of or scrolling a telephone directory list.

This is because since persons are listed in a telephone directory list in a mobile terminal device in an alphabetical order, a member (or members) who speaks (or speak) in a great number may be listed near an end or at a next page of a telephone directory list.

SUMMARY OF THE INVENTION

In view of the above-mentioned problems, it is an exemplary object of the present invention to provide a method of operating a telephone directory list in an electronic communication device, an electronic communication device, a method of operating a telephone directory list in PTT communication, a PTT communication system, and a computer-readable storage medium storing therein a program for carrying out the method, all of which are capable of reducing a load of turning pages of or scrolling a telephone directory list for looking for members with whom a user is going to make communication.

In order to achieve the above-mentioned object, the present invention provides a method of operating a telephone directory list in an electronic communication device, including, when a plurality of electronic communication devices each including a telephone directory list storing therein telephone numbers of other electronic communication devices makes communication to one another through a network, carrying out a certain operation to the telephone directory list in each of the electronic communication devices in accordance with a number of speeches made by each of other electronic communication devices.

For instance, the communication made through the network may be comprised of PTT communication.

For instance, the certain operation may be comprised of a step of re-arranging an order of other electronic communication devices stored in the telephone directory list such that a user who made speeches in a greater number is in a higher position in said telephone directory list.

In the method, the certain operation may be comprised of a step of re-arranging an order of other electronic communication devices stored in the telephone directory list such that a user who made speeches in a longer period of time is in a higher position in the telephone directory list.

As an alternative, the certain operation may be comprised of a step of displaying a user who made speeches in a number equal to or greater than a predetermined number, with a different color from others.

As an alternative, the certain operation may be comprised of a step of displaying a user who made speeches in a number equal to or greater than a predetermined number, together with an icon and/or an image.

The present invention further provides a method of operating a telephone directory list when a plurality of electronic communication devices each including a telephone directory list storing therein telephone numbers of other electronic communication devices makes PTT communication to one another through a network and a server, wherein when the server receives voice data transmitted from an electronic communication device as a speaker, and the server transmits the voice data in multi-casting communication to electronic communication devices other than the electronic communication device as a speaker, each of the electronic communication devices receiving the voice data re-arranges telephone numbers of other electronic communication devices stored in the telephone directory list, in accordance with a number of speeches made by each of other electronic communication devices.

The present invention further provides a method of operating a telephone directory list in an electronic communication device when a plurality of electronic communication devices each including a telephone directory list storing therein telephone numbers of other electronic communication devices makes PTT communication to one another through a network and a server, including on receipt of voice data in each of the electronic communication devices from other electronic communication devices through the server, counting up a number of speeches made by the other electronic communication devices stored in a telephone directory list, and carrying out a certain operation to the telephone directory list when a predetermined event occurs.

For instance, the certain operation may be comprised of a step of re-arranging an order of other electronic communication devices stored in the telephone directory list such that a user who made speeches in a greater number is in a higher position in said telephone directory list.

The present invention further provides a method of operating a telephone directory list in an electronic communication device in PTT communication when a plurality of electronic communication devices each including a telephone directory list storing therein telephone numbers of other electronic communication devices makes PTT communication to one another through a network and a server, including receiving in the server voice data transmitted from an electronic communication device as a speaker, carrying out multi-casting communication of the voice data by the server to electronic communication devices other than the electronic communication device as a speaker, on receipt of the voice data in each of the electronic communication devices, counting up a number of speeches made by the other electronic communication devices stored in a telephone directory list, and carrying out a certain operation to the telephone directory list when a predetermined event occurs.

For instance, the event may be comprised of termination of PTT communication.

For instance, the electronic communication device may be comprised of a mobile phone.

The present invention further provides an electronic communication device making communication with other electronic communication devices through a network, and including a telephone directory list storing therein telephone numbers of the other electronic communication devices, including means for operating a telephone directory list which carries out a certain operation to the telephone directory list in accordance with a number of speeches made by the other electronic communication devices.

For instance, the communication made through the network may be comprised of PTT communication.

The present invention further provides an electronic communication device making communication with other electronic communication devices through a network and a server, and including a telephone directory list storing therein telephone numbers of the other electronic communication devices, including a device for receiving data which receives a voice signal from the other electronic communication devices through the server, a device for counting up a number of speeches which, on receipt of the voice signal through the server, counts up a number of speeches made by the other electronic communication devices stored in a telephone directory list, and a device for operating a telephone directory list which carries out a certain operation to the telephone directory list when a predetermined event occurs.

For instance, the certain operation may be comprised of a step of re-arranging an order of other electronic communication devices stored in the telephone directory list such that a user who made speeches in a greater number is in a higher position in said telephone directory list.

For instance, the event may be comprised of termination of PTT communication.

For instance, the electronic communication device may be comprised of a mobile phone.

The present invention further provides an electronic communication device making communication with other electronic communication devices through a network and a server, and including a telephone directory list storing therein telephone numbers of the other electronic communication devices, including a data-receiver which receives a voice signal from the other electronic communication devices through the server, a counter which, on receipt of the voice signal through the server, counts up a number of speeches made by the other electronic communication devices stored in a telephone directory list, and a telephone directory list operator which carries out a certain operation to the telephone directory list when a predetermined event occurs.

For instance, the certain operation may be comprised of a step of re-arranging an order of other electronic communication devices stored in the telephone directory list such that a user who made speeches in a longer period of time is in a higher position in the telephone directory list.

As an alternative, the certain operation may be comprised of a step of displaying a user who made speeches in a number equal to or greater than a predetermined number, with a different color from others.

As an alternative, the certain operation may be comprised of a step of displaying a user who made speeches in a number equal to or greater than a predetermined number, together with an icon and/or an image.

The present invention further provides a PTT communication system in which a plurality of electronic communication devices each including a telephone directory list storing therein telephone numbers of other electronic communication devices makes communication with one another through a network, including a server which receives a voice signal transmitted from an electronic communication device as a speaker, and transmits the voice signal in multi-casting communication to electronic communication devices other than the electronic communication device as a speaker, and an electronic communication device as a receiver which, on receipt of the voice signal, carries out a certain operation to the telephone directory list in accordance with a number of speeches made by the electronic communication devices.

The present invention further provides a PTT communication system in which a plurality of electronic communication devices each including a telephone directory list storing therein telephone numbers of other electronic communication devices makes communication with one another through a network, including a server which receives a voice signal transmitted from an electronic communication device as a speaker, and transmits the voice signal in multi-casting communication to electronic communication devices other than the electronic communication device as a speaker, and an electronic communication device as a receiver which receives the voice signal, wherein the electronic communication device as a receiver comprises means for receiving data which receives the voice signal through the server, means for counting up a number of speeches which, on receipt of the voice signal, counts up a number of speeches made by the electronic communication device as a speaker, stored in a telephone directory list, and means for operating a telephone directory list which carries out a certain operation to the telephone directory list when a predetermined event occurs.

For instance, the event may be comprised of termination of PTT communication.

For instance, the electronic communication device may be comprised of a mobile phone.

The present invention further provides, in an electronic communication device including a central processing unit and a memory, a computer-readable storage medium storing therein a program stored in the memory for causing the central processing unit to carry out the above-mentioned method.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 5 illustrates an example of a telephone directory list equipped in the mobile phone in accordance with an embodiment of the present invention.

FIG. 6 illustrates an example of a telephone directory list equipped in the mobile phone in accordance with an embodiment of the present invention.

FIG. 7 illustrates an example of a telephone directory list equipped in the mobile phone in accordance with an embodiment of the present invention.

Exemplary embodiments in accordance with the present invention will be explained hereinbelow with reference to drawings.

It is assumed that an electronic communication device in accordance with the present exemplary embodiment is comprised of a mobile phone.

It is further assumed that the step for starting PTT communication, which was explained in "Background Art", has been already carried out. That is, a mobile terminal device which requested a server to transmit a PTT call, and mobile terminal devices which responded to the server that they could join PTT communication are in a condition for allowing them to make PTT communication with one another.

Figure 1:
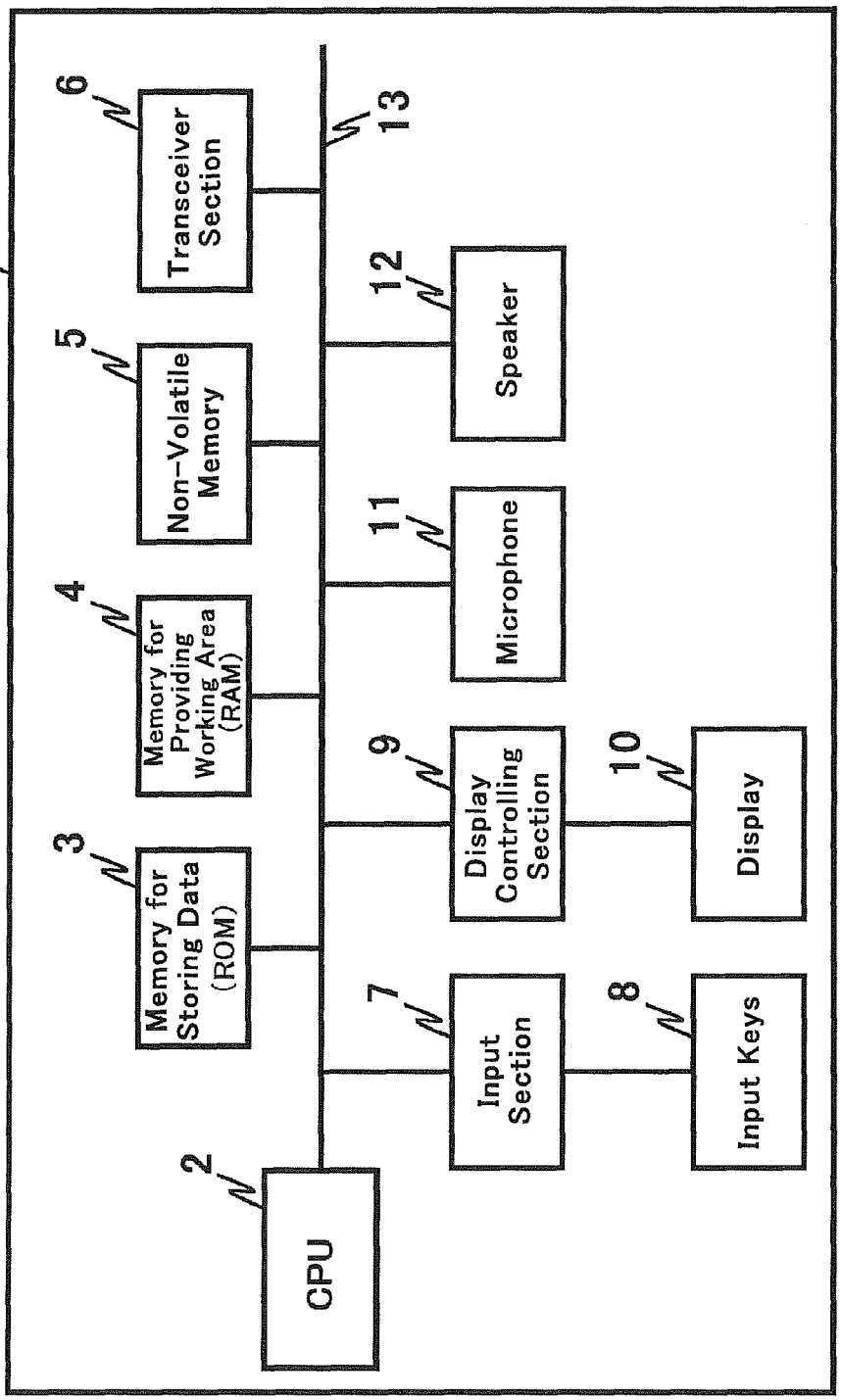
FIG. 1 is a block diagram of a mobile phone in accordance with an embodiment of the present invention.

FIG. 1 is a block diagram illustrating a circuitry of a mobile phone in accordance with an exemplary embodiment of the present invention.

The mobile phone 1 in accordance with the present exemplary embodiment is comprised of a CPU (central processing unit) 2, a memory 3 for storing data therein, a memory 4 for providing a working area, a non-volatile memory 5, a transceiver section 6, an input section 7, input keys 8, a display controlling section 9, a display 10, a microphone 11, a speaker 12, and a bus 13 for electrically connecting CPU 2 to other parts.

The memory 3 is comprised of a read only memory (ROM), and stores therein fixed data such as various control programs to be executed by CPU 2.

The memory 4 is comprised of a random access memory (RAM), and stores therein data temporarily required by CPU 2 to execute programs.

The non-volatile memory 5 is a semiconductor memory out of which data can be erased or into which data can be written, and which keeps data stored therein even when power is turned off. The non-volatile memory 5 can store therein a telephone directory list (a list in which names, telephone numbers, mail addresses, a number of speeches made in PTT communication, and so on are recorded), various fixed values, and user data.

The transceiver section 6 is comprised of a circuit for transmitting and receiving radio-signals, and making communication or conversation therethrough.

The input section 7 is comprised of a circuit which detects inputs having been made through the input keys 8. For instance, when a user would like to speak in PTT communication, he/she is required to acquire a right of speaking by actuating a predetermined key (a dedicated key or an off-hook key and so on) among the input keys 8 or keeping such a key actuated.

The display controlling section 9 is comprised of a circuit for controlling an operation of the display 10. The display 10 is mounted on a front surface of the mobile phone in accordance with the present exemplary embodiment, and is comprised of a display unit such as a color or black-and-white liquid crystal display device or an organic EL (electronic fluorescence) panel.

The microphone 11 transmits voices therethrough.

The speaker 12 emits melody, voices, confirmation sound, and so on.

Figure 2:
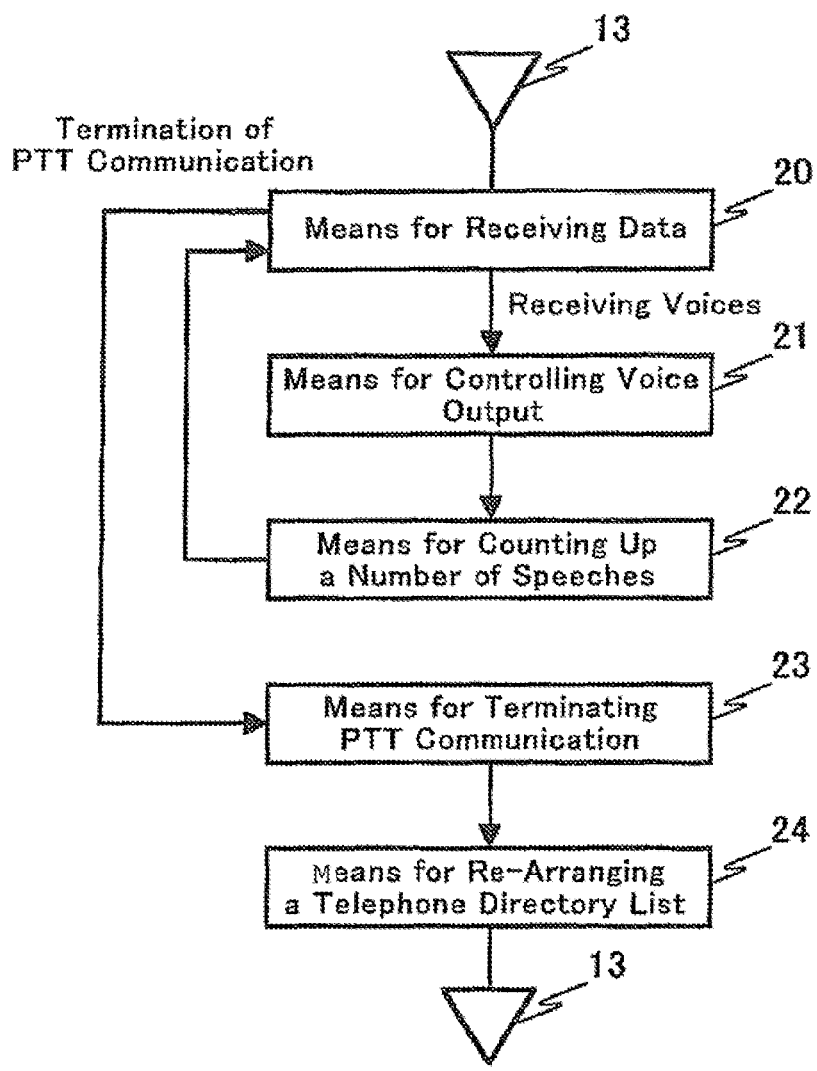
FIG. 2 is a block diagram showing functions of CPU (FIG. 1) and ROM (FIG. 1) of the mobile phone in accordance with an embodiment of the present invention.

FIG. 2 is a block diagram showing functions of CPU 2 and the memory 3 of the mobile phone 1 in accordance with the present exemplary embodiment.

As illustrated in FIG. 2, CPU 2 and the memory 3 functionally defines means 20 for receiving data, means 21 for controlling voice output, means 22 for counting up a number of speeches, means 23 for terminating PTT communication, and means 24 for re-arranging a telephone directory list.

Though not illustrated in FIG. 2, CPU 2 further defines means for controlling mobile communication. In FIG. 2, triangle signs indicate the bus 13.

The means 20 for receiving data receives voices of a speaker, control data, and so on from a server. The means 20 for receiving data is electrically connected to the transceiver section 6 through the bus 13.

The means 21 for controlling voice output, when data received from a server is comprised of voices of a speaker, not only outputs the received voices to the speaker 12, but also retrieves a name of the speaker out of a telephone directory list, based on a telephone number of the speaker included in the received data, and displays the name of the speaker in the display 10. The means 21 for controlling voice output is electrically connected to the speaker 12 through the bus 13.

The means 21 for controlling voice output further starts up the means 22 for counting up a number of speeches.

After starting up, the means 22 for counting up a number of speeches counts up a number of speeches made by each of speakers listed in a telephone directory list (a structure thereof is detailed later), and transmits the counted numbers to the means 20 for receiving data.

The means 23 for terminating PTT communication is started up by the means 20 for receiving data, when data received from a server includes a notification of termination of PTT communication, and carries out a conventional process of terminating PTT communication such as releasing a session having been made between the mobile phone and a server.

The means 23 for terminating PTT communication further starts up the means 24 for re-arranging a telephone directory list.

After starting up, the means 24 for re-arranging a telephone directory list re-arranges an order of persons recorded in a telephone directory list in accordance with a number of speeches.

The "means for operating a telephone directory list" defined in claims corresponds to the means 24 for re-arranging a telephone directory list.

Figure 3:
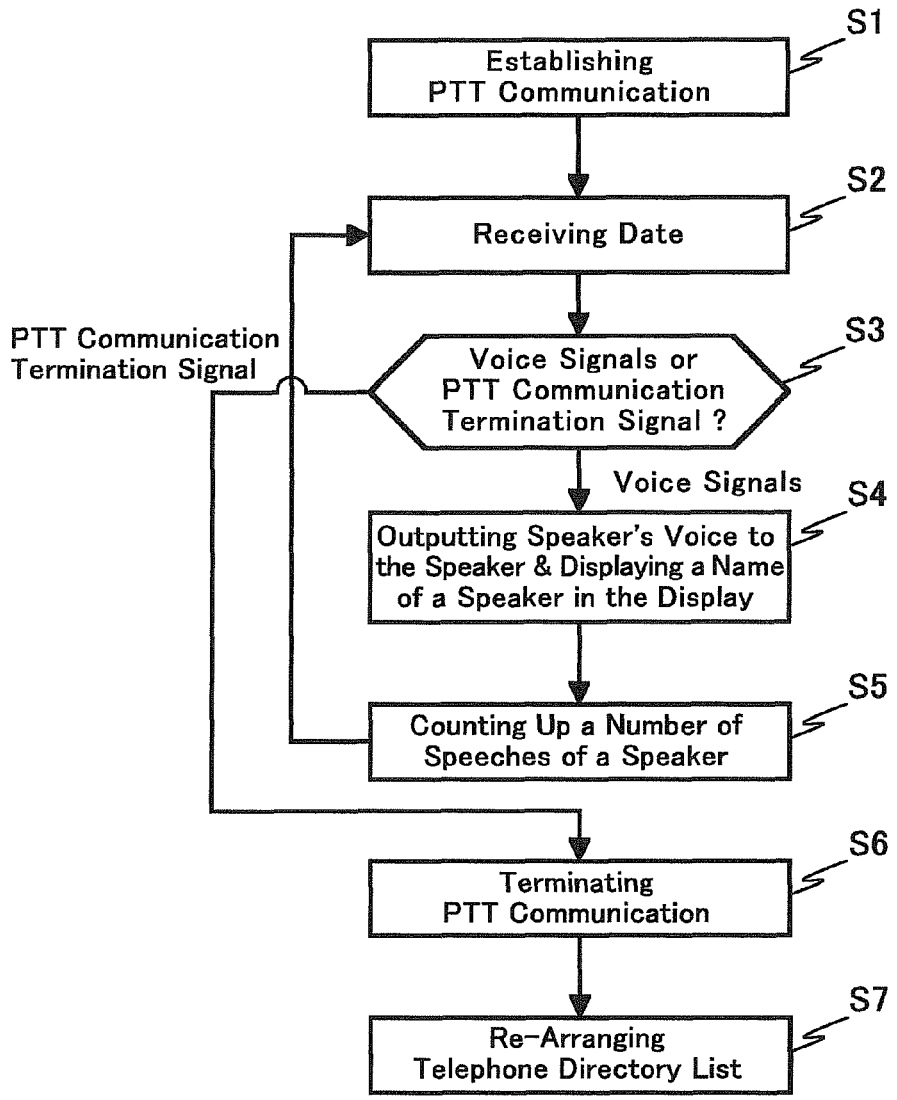
FIG. 3 is a flow-chart showing an operation of CPU equipped in the mobile phone in accordance with an embodiment of the present invention.

FIG. 3 is a flow-chart showing an operation of CPU 2 equipped in the mobile phone 1 in accordance with the present exemplary embodiment.

In the mobile phone 1 in accordance with the present exemplary embodiment, when a user actuates a predetermined key arranged for starting PTT communication, among the input keys 8, key data indicative of a request of starting PTT communication is transmitted to CPU 2 from the input section 7. As a result, CPU 2 establishes a session with a server, and carries out SIP through the transceiver section 6 for establishing PTT communication.

Thus, a channel is established between the mobile phone 1 and a PTT server (not illustrated), and PTT communication starts (step S1).

Then, the mobile phone 1 receives data from a server through the transceiver section 6 (step S2). The received data is transmitted to CPU 2.

Then, the means 20 for receiving data judges whether the received data is comprised of voice signals indicative of voices of a speaker or the received data is comprised of a PTT communication termination signal including an instruction to terminate PTT communication (step S3).

If the received data is comprised of voice signals indicative of voices of a speaker, the means 21 for controlling voice output defined by CPU 2 of the mobile phone 1 outputs voices of a speaker to the speaker 12, and further, identifies a name of the speaker out of a telephone directory list, based on a telephone number of the speaker included in the received data, and controls the display controlling section 9 to display the name of the speaker in the display 10 (step S4).

Then, the means 22 for counting up a number of speeches counts up a number of speeches made by a speaker among persons recorded in a telephone directory list of the mobile phone 1 (step S5).

Then, until the mobile phone 1 receives the signal PTT communication termination signal, the above-mentioned steps S2 to S5 are repeatedly carried out.

If the mobile phone 1 receives data comprised of the PTT communication termination signal instructing the mobile phone to terminate PTT communication (step S3), the means 23 for terminating PTT communication carries out a conventional process of terminating PTT communication such as releasing a session having been made between the mobile phone and a server (step S6).

Then, the means 24 for re-arranging a telephone directory list re-arranges an order of persons recorded in a telephone directory list in accordance with a number of speeches (step S7).

Thus, persons recorded in a telephone directory list stored in the mobile phone 1 are re-arranged in an order in accordance with a number of speeches having been made in PTT communication.

Accordingly, there is provided an advantage that it does not take much time to find a person (or persons) who speaks (or speak) in a greater number, out of a telephone directory list stored in the mobile phone 1, in a next process of starting PTT communication.

Furthermore, since an order of persons recorded in a telephone directory list stored in the non-volatile memory 5 is re-arranged after termination of PTT communication in the mobile phone in accordance with the present exemplary embodiment, there is provided an advantage that it is possible to swiftly display a telephone directory list to be used in a next process of starting PTT communication.

Figure 4:
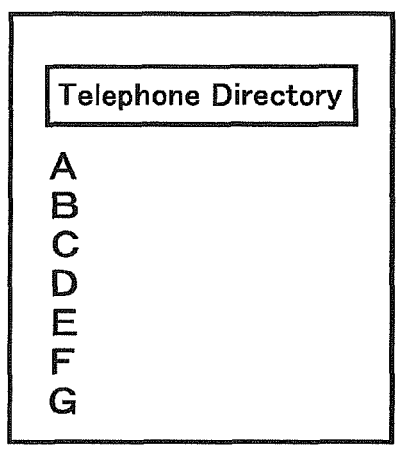
FIG. 4 illustrates a display screen in which a telephone directory list is not yet re-arranged in the mobile phone in accordance with an embodiment of the present invention.

FIG. 4 illustrates an example of a display screen of the display 10 in which a telephone directory list stored in the non-volatile memory 5 is displayed after PTT communication has been already made.

In the illustrated example, it is assumed that seven persons A to G are recorded in a telephone directory list.

FIG. 5 illustrates an example of a number of speeches made by each of persons recorded in a telephone directory list stored in the non-volatile memory 5 when the example illustrated in FIG. 4 is displayed in the display 10. In FIG. 5, a greater number of speeches is made by persons recorded in a telephone directory list in accordance with an alphabetical order. Specifically, a number of speeches made by A is 5, a number of speeches made by B is 3, and a number of speeches made by C, D, E, F and G is 1.

FIG. 6 shows a number of speeches made by each of the persons recorded in a telephone directory list stored in the non-volatile memory 5 when PTT communication has been made once after the condition illustrated in FIG. 5.

Specifically, in the next PTT communication having been made subsequently to the condition illustrated in FIG. 5, A made speeches three times, D made a speech once, and G made speeches twice.

FIG. 7 illustrates an order of the persons recorded in a telephone directory list stored in the non-volatile memory 5, having been re-arranged by the means 24 for re-arranging a telephone directory list in accordance with a number of speeches.

Figure 8:
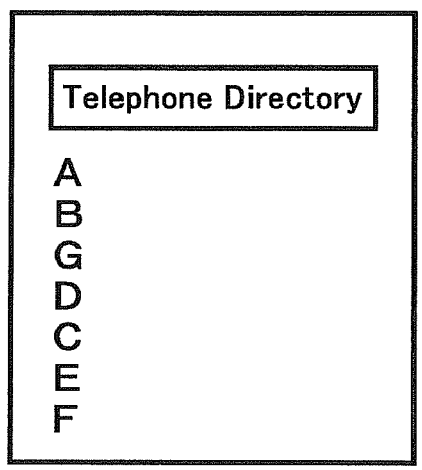
FIG. 8 illustrates a display screen in which a telephone directory list was re-arranged in the mobile phone in accordance with an embodiment of the present invention.

FIG. 8 illustrates the display 10 in which a telephone directory list stored in the non-volatile memory 5, illustrated in FIG. 7, is displayed.

As illustrated in FIG. 8, the persons recorded in a telephone directory list are displayed in an order having been re-arranged by the means 24 for re-arranging a telephone directory list in accordance with a number of speeches. Specifically, the persons are displayed in an order of A, B, G, D, C, E and F.

In the above-mentioned exemplary embodiment, it is assumed that an electronic communication device is comprised of a mobile phone. However, it should be noted that the present exemplary embodiment may be applied to a mobile terminal device such as PHS. That is, it is possible to provide the same advantages as those presented by the above-mentioned exemplary embodiment to a mobile terminal device such as PHS, by re-arranging a telephone directory list in accordance with a number of speeches.

In the above-mentioned exemplary embodiment, the means 24 for re-arranging a telephone directory list is designed to re-arrange a telephone directory list in accordance with a number of speeches. As an alternative, the means 24 for re-arranging a telephone directory list may be designed to re-arrange a telephone directory list in accordance with a period of time of speeches made by persons recorded in a telephone directory list.

In the above-mentioned exemplary embodiment, the means 24 for re-arranging a telephone directory list is designed to re-arrange a telephone directory list in accordance with a number of speeches. As an alternative, a name of a person who made speeches in a great number (specifically, a number equal to or greater than a predetermined number) may be displayed in a predetermined color (for instance, red) in a telephone directory list.

In the above-mentioned exemplary embodiment, the means 24 for re-arranging a telephone directory list is designed to re-arrange a telephone directory list in accordance with a number of speeches. As an alternative, a telephone directory list may be designed to be accompanied with an icon and/or an image of a person who made speeches in a great number (specifically, a number equal to or greater than a predetermined number), and they may be displayed when a user retrieves a telephone directory list.

The mobile phone may be designed to include means for making a user's decision as to whether the means 24 for re-arranging a telephone directory list re-arranges a telephone directory list in accordance with a number of speeches, in which case, a user can make a decision. For instance, a question "do you re-arrange a telephone directory list in accordance with a number of speeches?" may be displayed in a screen of the display 10, in which case, a telephone directory list is re-arranged only when a user inputs "YES".

Though the mobile phone 1 in accordance with the present exemplary embodiment is not designed to display a number of speeches of each of members, the mobile phone 1 may be designed to display a number of speeches or a graphically represented number of speeches together with a name of a speaker in the display 10.

Though a telephone directory list is re-arranged after termination of PTT communication in the above-mentioned exemplary embodiment, a telephone directory list may be re-arranged when a function of displaying a telephone directory list is caused to start. As an alternative, the means 24 for re-arranging a telephone directory list may be designed to start re-arranging a telephone directory list at a timing defined by predetermined key-input carried out by a user.

INDUSTRIAL APPLICABILITY

The present invention is applicable not only to a mobile phone, but also to other mobile terminal devices such as PHS. Specifically, it is possible to provide the same advantages as those presented by the present invention to a mobile terminal device such as PHS, by re-arranging a telephone directory list in accordance with a number of speeches.

In the above-mentioned exemplary embodiment, there has been explained a method of reducing a period of time for finding a person (or persons) who makes speeches (or make speeches) in a great number, out of a telephone directory list stored in an electronic communication device in a process of starting PTT communication. However, it should be noted that the present invention may be applicable to a conference system in which telephones are used for making communication.

The exemplary advantages obtained by the above-mentioned exemplary embodiments are described hereinbelow.

The above-mentioned exemplary embodiment provides an exemplary advantage that it does not take much time for finding a person (or persons) who speaks (or speak) in a great number out of a telephone directory list in a user's electronic communication device.

This is because that the present exemplary embodiment counts a number of speeches made by each of members in PTT communication in each of electronic communication devices, and uses data indicating a number of counted speeches to thereby re-arrange a telephone directory list in accordance with a number of speeches.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of operating a telephone directory list in an electronic communication device, comprising, when a plurality of electronic communication devices each including a telephone directory list storing therein telephone numbers of other electronic communication devices makes communication to one another through a network, carrying out a certain operation to said telephone directory list in each of said electronic communication devices in accordance with a number of speeches made by each of other electronic communication devices.

2. The method as set forth in claim 1, wherein said communication made through said network is comprised of PTT communication.

3. The method as set forth in claim 1, wherein said certain operation is comprised of a step of re-arranging an order of other electronic communication devices stored in said telephone directory list such that a user who made speeches in a greater number is in a higher position in said telephone directory list.

4. The method as set forth in claim 1, wherein said certain operation is comprised of a step of re-arranging an order of other electronic communication devices stored in said telephone directory list such that a user who made speeches in a longer period of time is in a higher position in said telephone directory list.

5. The method as set forth in claim 1, wherein said certain operation is comprised of a step of displaying a user who made speeches in a number equal to or greater than a predetermined number, with a different color from others.

6. The method as set forth in any one of claims 1, wherein said certain operation is comprised of a step of displaying a user who made speeches in a number equal to or greater than a predetermined number, together with an icon and/or an image.

7. The method as set forth in claim 1, wherein said electronic communication device is comprised of a mobile phone.

8. In an electronic communication device including a central processing unit and a memory, a computer-readable storage medium storing therein a program stored in said memory for causing said central processing unit to carry out the method as set forth in claim 1.

9. A method of operating a telephone directory list when a plurality of electronic communication devices each including a telephone directory list storing therein telephone numbers of other electronic communication devices makes PTT communication to one another through a network and a server,
wherein when said server receives voice data transmitted from an electronic communication device as a speaker, and said server transmits said voice data in multi-casting communication to electronic communication devices other than said electronic communication device as a speaker, each of said electronic communication devices receiving said voice data re-arranges telephone numbers of other electronic communication devices stored in said telephone directory list, in accordance with a number of speeches made by each of other electronic communication devices.

10. In an electronic communication device including a central processing unit and a memory, a computer-readable storage medium storing therein a program stored in said memory for causing said central processing unit to carry out the method as set forth in claim 9.

11. A method of operating a telephone directory list in an electronic communication device when a plurality of electronic communication devices each including a telephone directory list storing therein telephone numbers of other electronic communication devices makes PTT communication to one another through a network and a server, comprising:
on receipt of voice data in each of said electronic communication devices from other electronic communication devices through said server, counting up a number of speeches made by said other electronic communication devices stored in a telephone directory list, and
carrying out a certain operation to said telephone directory list when a predetermined event occurs.

12. The method as set forth in claim 11, wherein said certain operation is comprised of a step of re-arranging an order of other electronic communication devices stored in said telephone directory list such that a user who made speeches in a greater number is in a higher position in said telephone directory list.

13. The method as set forth in claim 11, wherein said certain operation is comprised of a step of re-arranging an order of other electronic communication devices stored in said telephone directory list such that a user who made speeches in a longer period of time is in a higher position in said telephone directory list.

14. The method as set forth in claim 11, wherein said certain operation is comprised of a step of displaying a user who made speeches in a number equal to or greater than a predetermined number, with a different color from others.

15. The method as set forth in claim 11, wherein said certain operation is comprised of a step of displaying a user who made speeches in a number equal to or greater than a predetermined number, together with an icon and/or an image.

16. The method as set forth in claim 11, wherein said event is comprised of termination of PTT communication.

17. The method as set forth in claim 9, wherein said electronic communication device is comprised of a mobile phone.

18. In an electronic communication device including a central processing unit and a memory, a computer-readable storage medium storing therein a program stored in said memory for causing said central processing unit to carry out the method as set forth in claim 11.

19. A method of operating a telephone directory list in an electronic communication device in PTT communication when a plurality of electronic communication devices each including a telephone directory list storing therein telephone numbers of other electronic communication devices makes PTT communication to one another through a network and a server, comprising:
receiving in said server voice data transmitted from an electronic communication device as a speaker;
carrying out multi-casting communication of said voice data by said server to electronic communication devices other than said electronic communication device as a speaker;
on receipt of said voice data in each of said electronic communication devices, counting up a number of speeches made by said other electronic communication devices stored in a telephone directory list, and
carrying out a certain operation to said telephone directory list when a predetermined event occurs.

20. The method as set forth in claim 19, wherein said event is comprised of termination of PTT communication.

21. The method as set forth in claim 19, wherein said electronic communication device is comprised of a mobile phone.

22. In an electronic communication device including a central processing unit and a memory, a computer-readable storage medium storing therein a program stored in said memory for causing said central processing unit to carry out the method as set forth in claim 19.

23. An electronic communication device making communication with other electronic communication devices through a network, and including a telephone directory list storing therein telephone numbers of said other electronic communication devices, comprising means for operating a telephone directory list which carries out a certain operation to said telephone directory list in accordance with a number of speeches made by said other electronic communication devices.

24. The electronic communication device as set forth in claim 23, wherein said communication made through said network is comprised of PTT communication.

25. The electronic communication device as set forth in claim 23, wherein said certain operation is comprised of a step of re-arranging an order of other electronic communication devices stored in said telephone directory list such that a user who made speeches in a greater number is in a higher position in said telephone directory list.

26. The electronic communication device as set forth in claim 23, wherein said electronic communication device is comprised of a mobile phone.

27. The electronic communication device as set forth in claim 23, wherein said certain operation is comprised of a step of re-arranging an order of other electronic communication devices stored in said telephone directory list such that a user who made speeches in a longer period of time is in a higher position in said telephone directory list.

28. The electronic communication device as set forth in claim 23, wherein said certain operation is comprised of a step of displaying a user who made speeches in a number equal to or greater than a predetermined number, with a different color from others.

29. The electronic communication device as set forth in claim 23, wherein said certain operation is comprised of a step of displaying a user who made speeches in a number equal to or greater than a predetermined number, together with an icon and/or an image.

30. An electronic communication device making communication with other electronic communication devices through a network and a server, and including a telephone directory list storing therein telephone numbers of said other electronic communication devices, comprising:
   means for receiving data which receives a voice signal from said other electronic communication devices through said server;
   means for counting up a number of speeches which, on receipt of said voice signal through said server, counts up a number of speeches made by said other electronic communication devices stored in a telephone directory list; and
   means for operating a telephone directory list which carries out a certain operation to said telephone directory list when a predetermined event occurs.

31. The electronic communication device as set forth in claim 30, wherein said certain operation is comprised of a step of re-arranging an order of other electronic communication devices stored in said telephone directory list such that a user who made speeches in a greater number is in a higher position in said telephone directory list.

32. The electronic communication device as set forth in claim 30, wherein said event is comprised of termination of PTT communication.

33. The electronic communication device as set forth in claim 30, wherein said electronic communication device is comprised of a mobile phone.

34. The electronic communication device as set forth in claim 30, wherein said certain operation is comprised of a step of re-arranging an order of other electronic communication devices stored in said telephone directory list such that a user who made speeches in a longer period of time is in a higher position in said telephone directory list.

35. The electronic communication device as set forth in claim 30, wherein said certain operation is comprised of a step of displaying a user who made speeches in a number equal to or greater than a predetermined number, with a different color from others.

36. The electronic communication device as set forth in claim 30, wherein said certain operation is comprised of a step of displaying a user who made speeches in a number equal to or greater than a predetermined number, together with an icon and/or an image.

37. An electronic communication device making communication with other electronic communication devices through a network and a server, and including a telephone directory list storing therein telephone numbers of said other electronic communication devices, comprising:
   a data-receiver which receives a voice signal from said other electronic communication devices through said server;
   a counter which, on receipt of said voice signal through said server, counts up a number of speeches made by said other electronic communication devices stored in a telephone directory list; and
   a telephone directory list operator which carries out a certain operation to said telephone directory list when a predetermined event occurs.

38. The electronic communication device as set forth in claim 37, wherein said certain operation is comprised of a step of re-arranging an order of other electronic communication devices stored in said telephone directory list such that a user who made speeches in a greater number is in a higher position in said telephone directory list.

39. The electronic communication device as set forth in claim 37, wherein said event is comprised of termination of PTT communication.

40. The electronic communication device as set forth in claim 37, wherein said electronic communication device is comprised of a mobile phone.

41. The electronic communication device as set forth in claim 37, wherein said certain operation is comprised of a step of re-arranging an order of other electronic communication devices stored in said telephone directory list such that a user who made speeches in a longer period of time is in a higher position in said telephone directory list.

42. The electronic communication device as set forth in claim 37, wherein said certain operation is comprised of a step of displaying a user who made speeches in a number equal to or greater than a predetermined number, with a different color from others.

43. The electronic communication device as set forth in claim 37, wherein said certain operation is comprised of a step of displaying a user who made speeches in a number equal to or greater than a predetermined number, together with an icon and/or an image.

44. A PTT communication system in which a plurality of electronic communication devices each including a telephone directory list storing therein telephone numbers of other electronic communication devices makes communication with one another through a network, comprising:
   a server which receives a voice signal transmitted from an electronic communication device as a speaker, and transmits said voice signal in multi-casting communication to electronic communication devices other than said electronic communication device as a speaker; and
   an electronic communication device as a receiver which, on receipt of said voice signal, carries out a certain operation to said telephone directory list in accordance with a number of speeches made by said electronic communication devices.

45. The PTT communication system as set forth in claim 44, wherein said electronic communication device is comprised of a mobile phone.

46. A PTT communication system in which a plurality of electronic communication devices each including a telephone directory list storing therein telephone numbers of other electronic communication devices makes communication with one another through a network, comprising:
   a server which receives a voice signal transmitted from an electronic communication device as a speaker, and transmits said voice signal in multi-casting communication to electronic communication devices other than said electronic communication device as a speaker; and
   an electronic communication device as a receiver which receives said voice signal, wherein said electronic communication device as a receiver comprises:

means for receiving data which receives said voice signal through said server;

means for counting up a number of speeches which, on receipt of said voice signal, counts up a number of speeches made by said electronic communication device as a speaker, stored in a telephone directory list; and means for operating a telephone directory list which carries out a certain operation to said telephone directory list when a predetermined event occurs.

47. The PTT communication system as set forth in claim 46, wherein said event is comprised of termination of PTT communication.

48. The PTT communication system as set forth in claim 46, wherein said electronic communication device is comprised of a mobile phone.

* * * * *